Dec. 17, 1946.   R. STEVENSON   2,412,923
VARIABLE PITCH PROPELLER
Filed Sept. 6, 1940   13 Sheets-Sheet 2

INVENTOR.
Robert Stevenson
BY Barlow & Barlow
ATTORNEYS.

Dec. 17, 1946.   R. STEVENSON   2,412,923
VARIABLE PITCH PROPELLER
Filed Sept. 6, 1940   13 Sheets-Sheet 4

INVENTOR.
Robert Stevenson
BY Barlow & Barlow
ATTORNEYS.

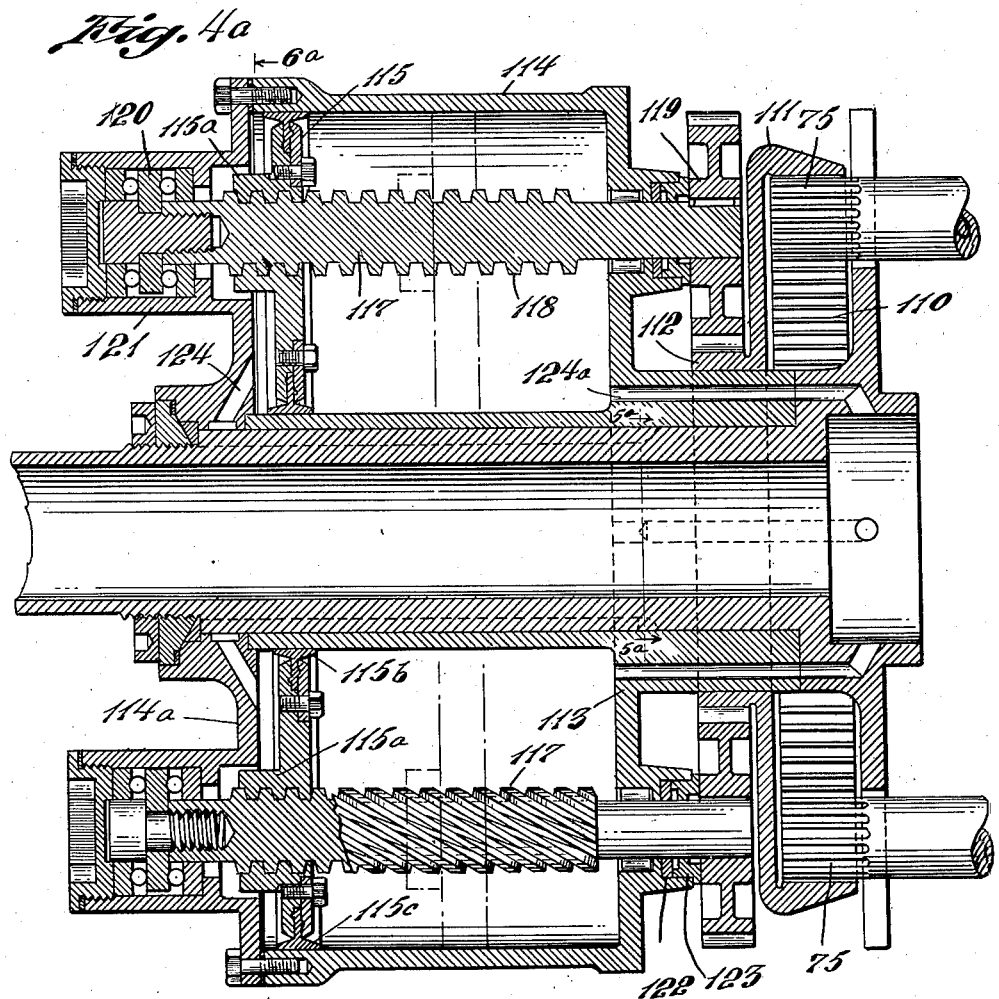
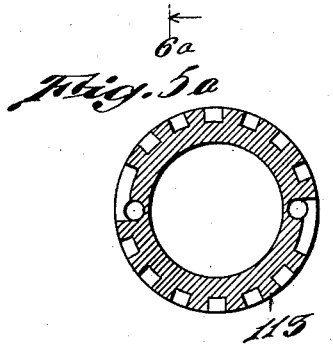

Dec. 17, 1946.  R. STEVENSON  2,412,923
VARIABLE PITCH PROPELLER
Filed Sept. 6, 1940   13 Sheets-Sheet 6

INVENTOR.
Robert Stevenson
BY Barlow & Barlow
ATTORNEYS.

Dec. 17, 1946.  R. STEVENSON  2,412,923
VARIABLE PITCH PROPELLER
Filed Sept. 6, 1940  13 Sheets-Sheet 7

INVENTOR.
Robert Stevenson
BY Barlow & Barlow
ATTORNEYS.

Dec. 17, 1946.  R. STEVENSON  2,412,923
VARIABLE PITCH PROPELLER
Filed Sept. 6, 1940  13 Sheets-Sheet 8

INVENTOR.
Robert Stevenson
BY Barlow & Barlow
ATTORNEYS.

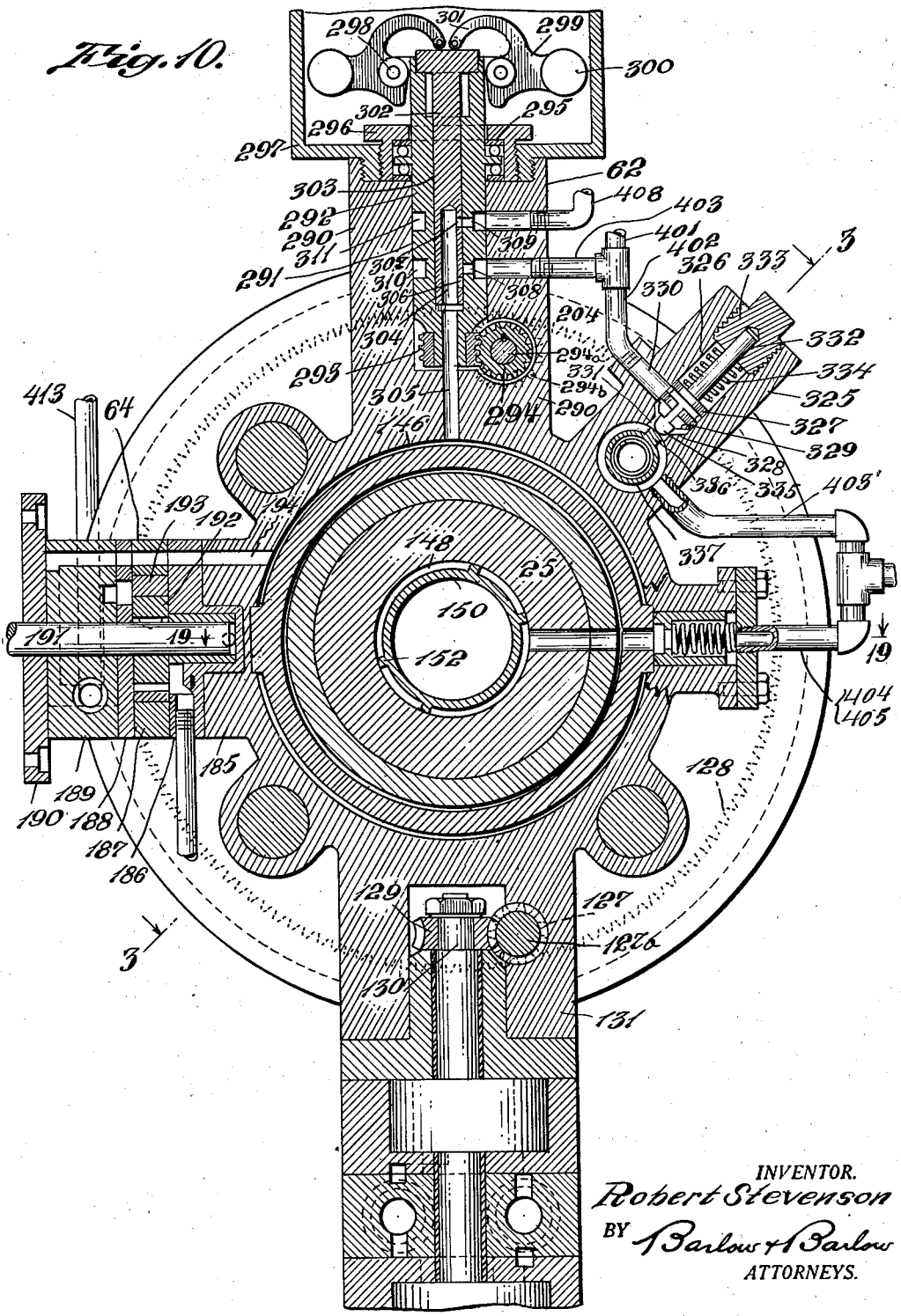

Dec. 17, 1946.  R. STEVENSON  2,412,923
VARIABLE PITCH PROPELLER
Filed Sept. 6, 1940  13 Sheets-Sheet 10
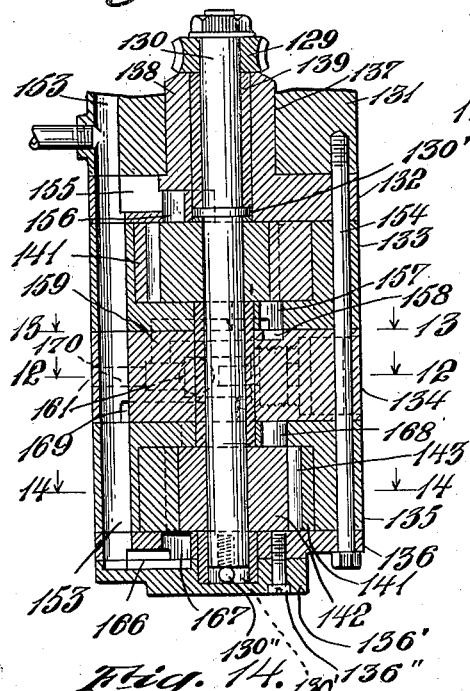
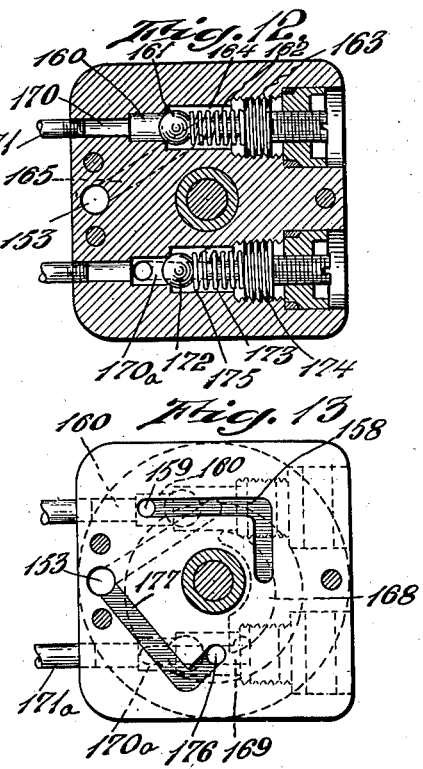
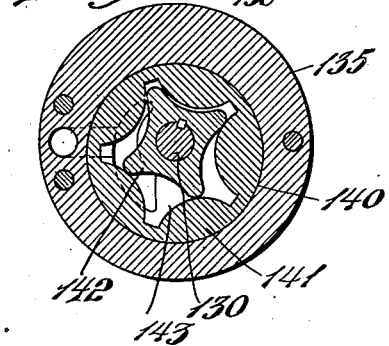
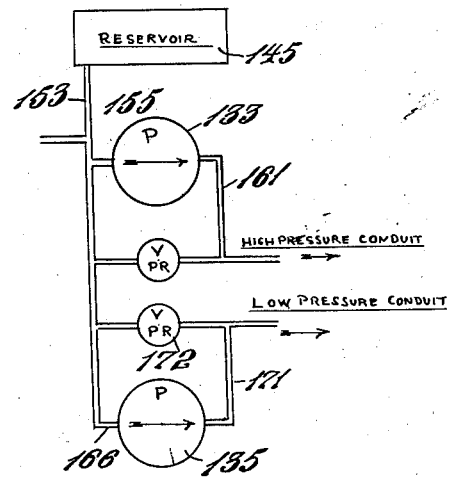
INVENTOR.
Robert Stevenson
BY Barlow & Barlow
ATTORNEYS.

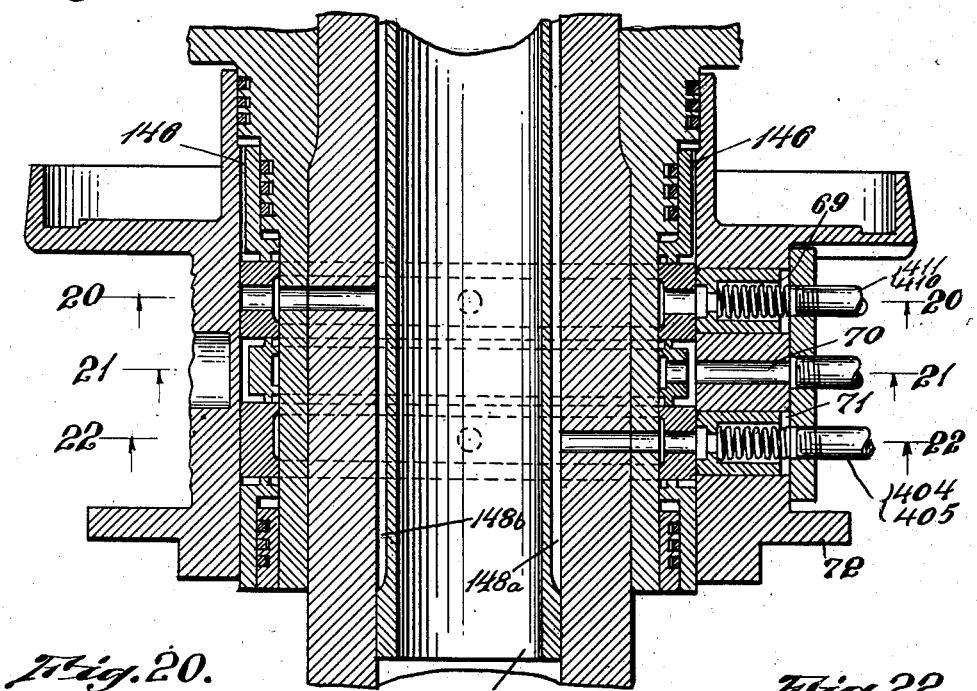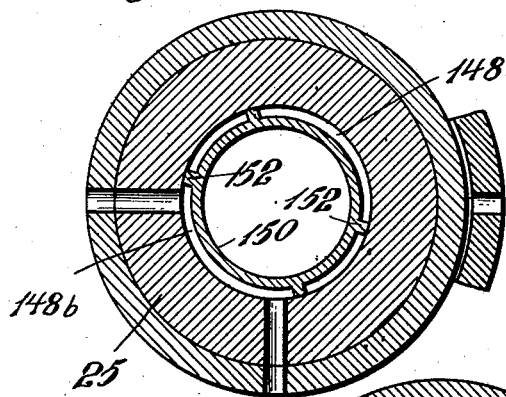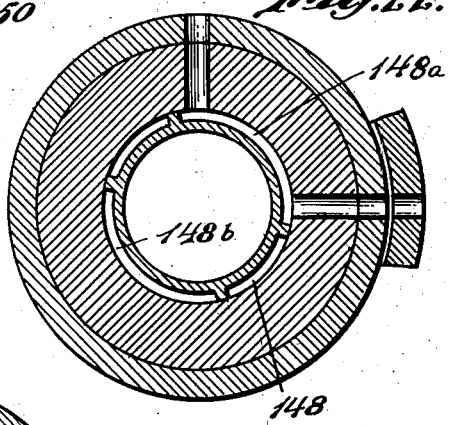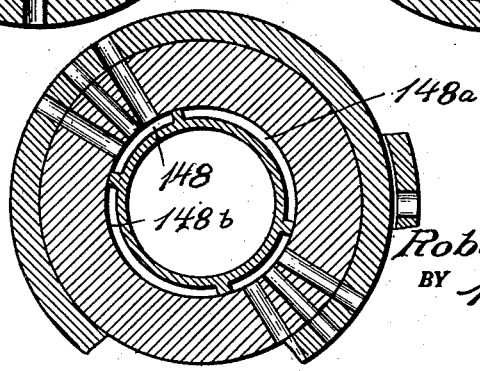

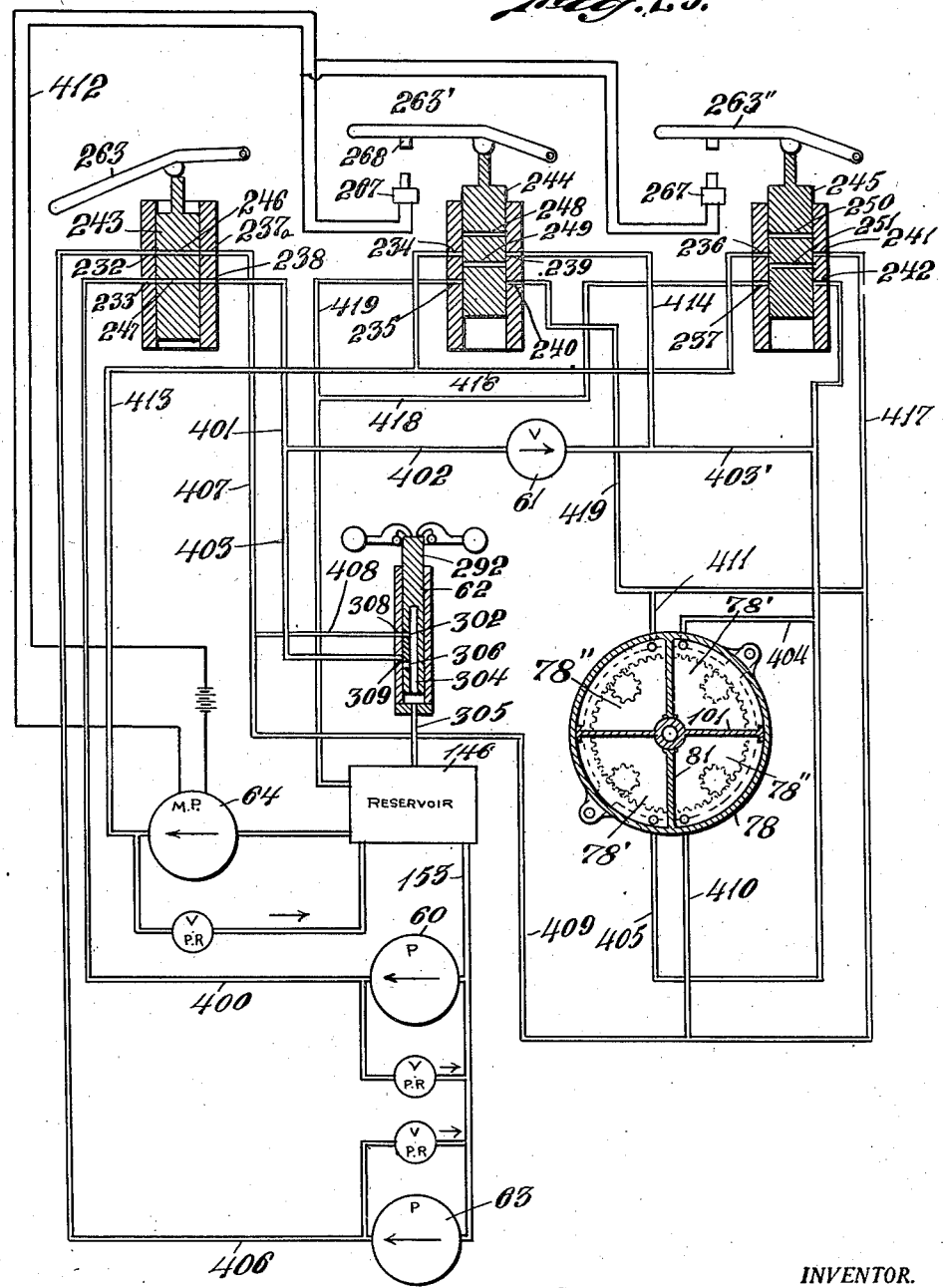

Patented Dec. 17, 1946

2,412,923

UNITED STATES PATENT OFFICE 2,412,923

VARIABLE PITCH PROPELLER

Robert Stevenson, Providence, R. I., assignor to Stevenson Engineering Corporation, a corporation of Rhode Island Application September 6, 1940, Serial No. 355,626

5 Claims. (Cl. 170—163)

This invention relates to aerial propulsion, more particularly to a mechanism for changing the pitch of the blades of a propeller. It has for its objects various accomplishments in the improvement of such mechanism. One of the objects of the invention is to provide a hollow shaft in connection with a mechanism for varying the pitch of the propeller blades in order that a shot may be fired through the shaft.

Another object of the invention is to provide a self-locking arrangement in connection with the varying of the pitch of the blades of the propeller so that there will be a sufficient resistance to pressure on the blades to maintain them in adjusted position which under some conditions such as due to diving or failure of oil pressure causes the blades to move from adjustment and flatten out.

Another object of the invention is to provide for a large portion of the operating mechanism, such, for instance, as the pumps and governors to be at a location inboard from the plane of rotation of the propeller blades that the operating mechanism may be better supported.

Another object of the invention is to improve the root mounting of the propeller blade in the hub of the propeller and to enable more blades to be mounted on a hub of a given size.

Another object of the invention is to arrange an operating hydraulic power mechanism for the changing of the pitch of the propeller blades which will have large areas that lower pressures may be utilized of the hydraulic means to develop the power necessary for shifting the pitch of the propeller.

Another object of the invention is to provide an automatic control by means of a governor for the fluid pressure control of the blade mechanism.

With these and other objects in view, the invention consists of certain novel features of construction, as will be more fully described, and particularly pointed out in the appended claims.

In the accompanying drawings:

Fig. 4a is a central longitudinal sectional view of an alternative form of mechanism to that shown in Fig. 4;

Fig. 5a is a sectional view taken substantially on line 5a—5a of Fig. 4a;

Fig. 6a is a sectional view taken substantially on line 6a—6a of Fig. 4a;

Fig. 10 is a section on substantially line 10—10 of Fig. 1;

Fig. 11 is a detailed view of the pump assembly;

Fig. 12 is a section on line 12—12 of Fig. 11;

Fig. 13 is a section on line 13—13 of Fig. 11;

Fig. 14 is a section on line 14—14 of Fig. 11;

Fig. 15 is a schematic diagram illustrating the relationship of the pumps, control valves and conduits in connection with the reservoir;

Fig. 19 is a fragmental section showing certain fluid conduits on substantially line 19—19 of Fig. 10;

Fig. 20 is a section on line 20—20 of Fig. 19;

Fig. 21 is a section on line 21—21 of Fig. 19;

Fig. 22 is a section on line 22—22 of Fig. 19;

Fig. 23 is a schematic view illustrating the control conduits with relation to the various valves, governor, pumps and power mechanism, also showing the electrical control for the motor pump.

In the use of an air propulsion mechanism the change of pitch of the blades for the purpose of changing the effective drive of the propeller and for feathering the blades of the propeller to lessen the resistance when the engine is stopped in the air or for unfeathering the blades when the engine is idling on the ground, strong pressures are developed which it is required to overcome. There is also the problem of shooting with feathering blade propellers which cannot be done through the blade at the present time as it is not so arranged that shooting may be done through the shaft of the propeller, as this shaft has been utilized for other purposes. To overcome these disadvantages I have arranged that shooting may be done through the shaft. Further, in diving of a plane, thousands of pounds per square inch of pressure is developed on the propeller blades and in propellers whose pitch is changed there is frequently such pressures developed that the resistance to turning is overcome and the blades flatten out because of such pressures as are developed. Accordingly, it is desirable that some arrangement be made so that propellers cannot flatten out and that their driving force may still continue to operate. Accordingly, I have arranged for a locking device so that the propellers cannot flatten out, and I have provided a controlled positive actuating mechanism for returning the propellers to their feathering position. This mechanism which I have developed is a completely self-contained unit which may be applied to the propeller shaft and itself containing all of the liquid used for the hydraulic power, not utilizing the lubricating oil of the engine which would be entirely separate therefrom. The mechanism is also arranged so that it will operate in the power-transmitting fluid that the working parts may be continuously lubricated.

The apparatus may be considered as a plurality of assembled cooperating units which act together. There is a propeller blade mounting assembly, a pitch-changing mechanism for the propeller blades, a fluid pressure supply consisting of a pump which is located at some convenient point, usually inboard of the plane of rotation of the propeller blade, but preferably close to the pitch-changing mechanism, and a means for controlling the pressure supply of the fluid for the hydraulic power from the pump to the pitch-changing mechanism. These various parts of the mechanism will be described substantially in the order enumerated.

*Propeller blade mounting*

Figure 2:
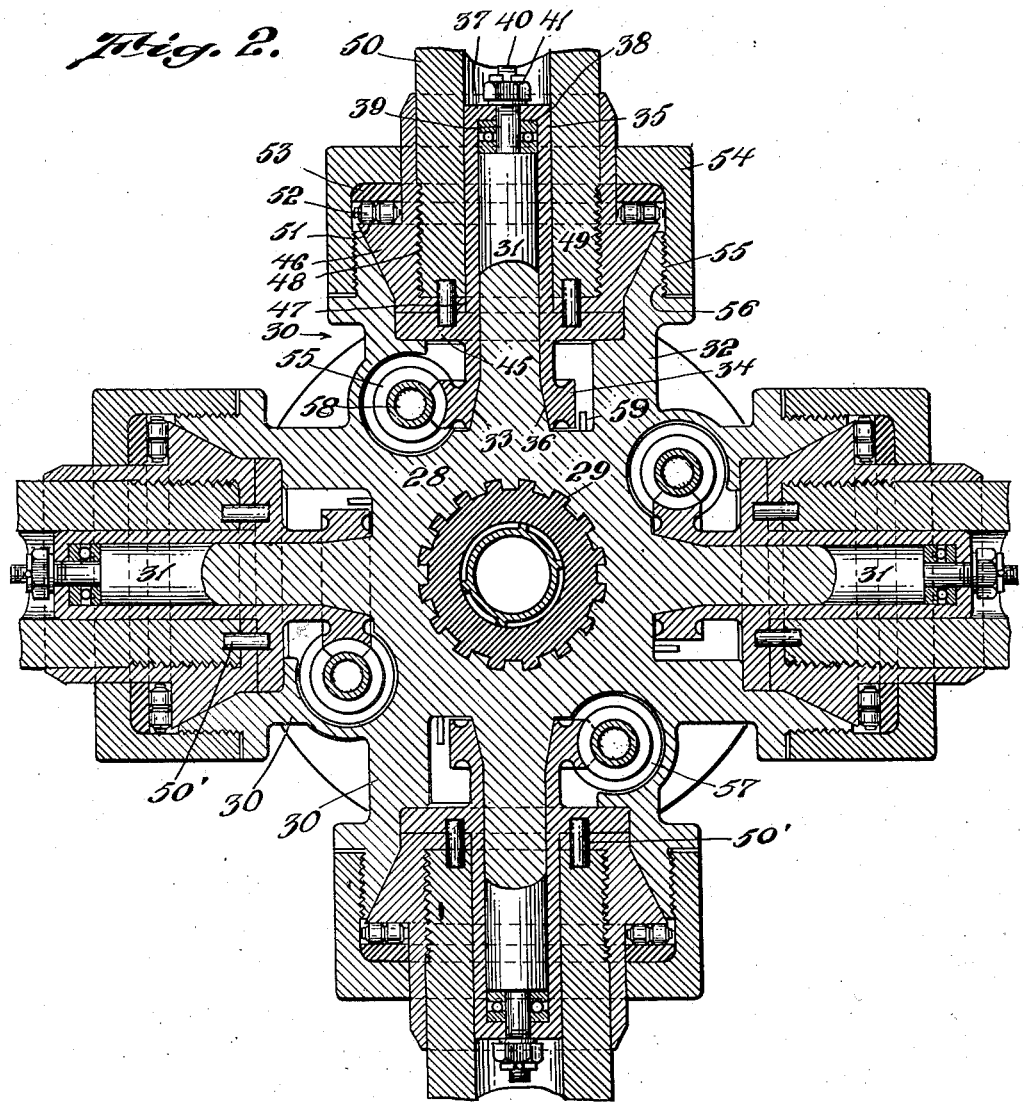
Fig. 2 is a section on substantially line 2—2 of Fig. 1.

It will be understood that I have illustrated merely the outboard end portion of the propeller shaft 25 which extends outward through the casing 26 supported by a radial ball bearing 27 mounted in the casing, and driven from some suitable driving mechanism such, for instance, as an engine. A propeller hub 28 is mounted on the propeller shaft 25 by means of splines 29 at a plurality of different locations peripherally about the shaft, as shown in Fig. 2. This hub 28, as shown in Fig. 2, is arranged for the mounting of four propeller blades, the same being equally spaced at an arcuate distance of ninety degrees; and for this purpose there are four outwardly-projecting portions 30 from the hub 28, each arranged to provide an integral stud 31 and a collar 32 spaced from the stud. This stud 31 is tapered as at 33 at its inner end, and a gear 34 is mounted upon this stud having a long tubular bearing portion 35 flared as at 36 to receive the tapered portion 33 of the stud. This tubular bearing is flanged inwardly as at 37, one end to house a thrust ball bearing 38 therein, the inwardly-extending portion also receiving the reduced portion 39 of the stud 31 which is threaded as at 40 and provided with a nut 41 to rotatably mount the same on the stud.

A flange 45 extends laterally from the tubular bearing portion 35 which assists in locating the cup 46 which has an opening 47 to receive the tube 35. The cup is threaded as at 48 to receive the threaded root 49 of the propeller blade 50 and after being assembled therewith is keyed to the cup by dowel pin 50' which projects from the inner side of the cup to be positioned into recesses in the flange 45. This cup is provided with a roller bearing surface 51 against which the rollers 52 engage on one side while engaging the circular plate on the opposite side which is held in position by the nut 54 threaded as at 55 to engage the outer threads 56 of the projecting portion 32. In this way the cup 46 is rotatably mounted on the projection 30 and provided with roller bearings to support the centrifugal force tending to throw the blade outwardly so that easier rotation of the blade for changing its pitch may be had.

Each gear 34 is in the form of a worm gear and is rotated by a worm 57 which has portions 58 and 58' extending therefrom and in which a bore 42 extends therethrough. Each blade root is of the same construction, and the four worms 57 are operated in unison to actuate the same. Thus, all of the blades will rotate about their studs 31 simultaneously to receive the same feathering or angular position with relation thereto. Each of the worm gears 34 is of segmental shape and is limited in its rotating movement by suitable abutment means as 59 engaging the ends of the segment. As this root mounting is located within the oil casing, it is continually operating in a lubricant. Each worm 57 is of the type more fully described in my Patent No. 1,982,768 which will not be rotated by torque exerted on the blade.

*Blade pitch changing mechanism*

Figure 1:
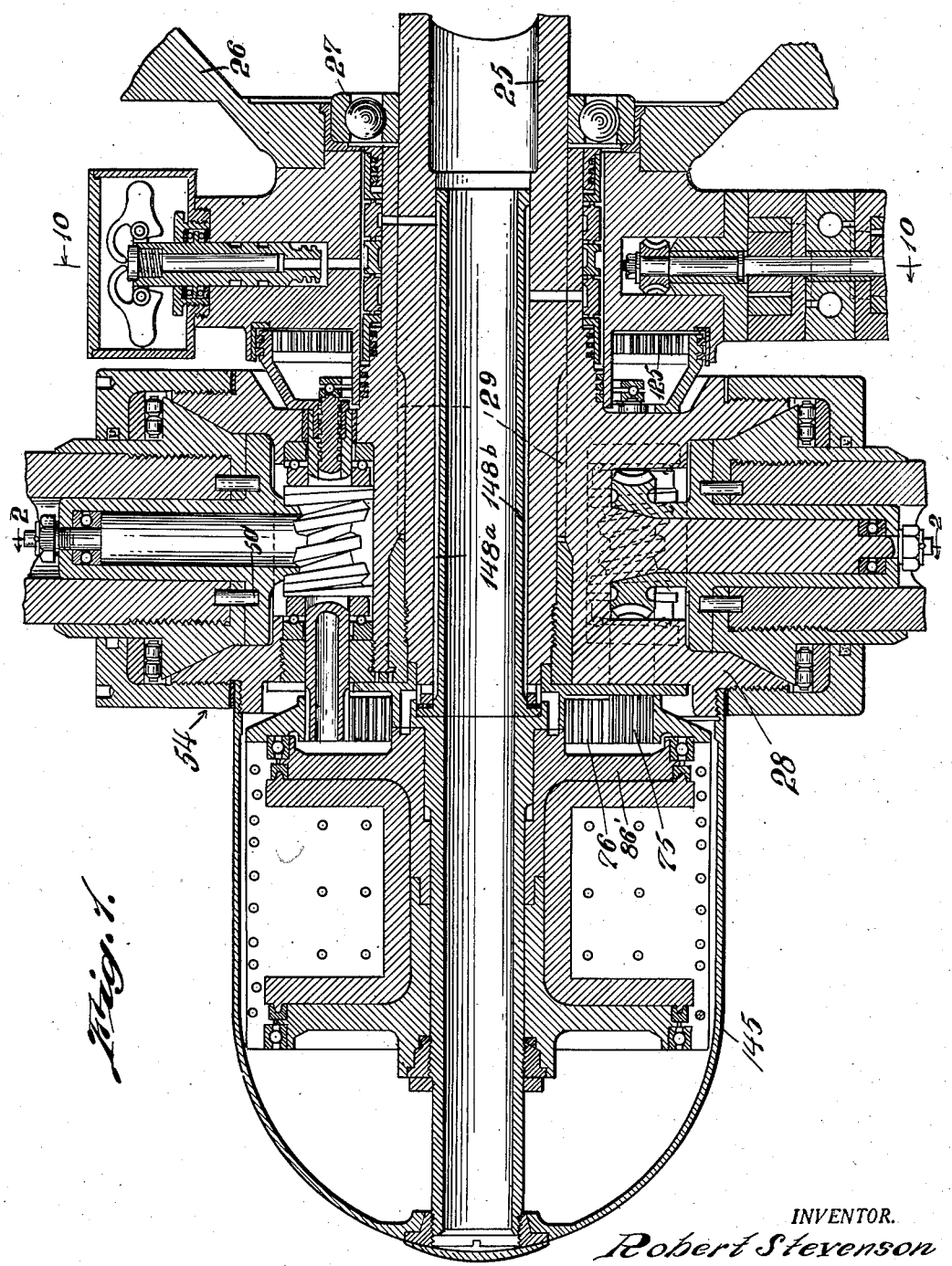
Fig. 1 is a sectional view taken generally centrally and illustrating various parts of the outboard propeller shaft and certain of the controls for the varying of the pitch of the propeller blades.
Figure 4:
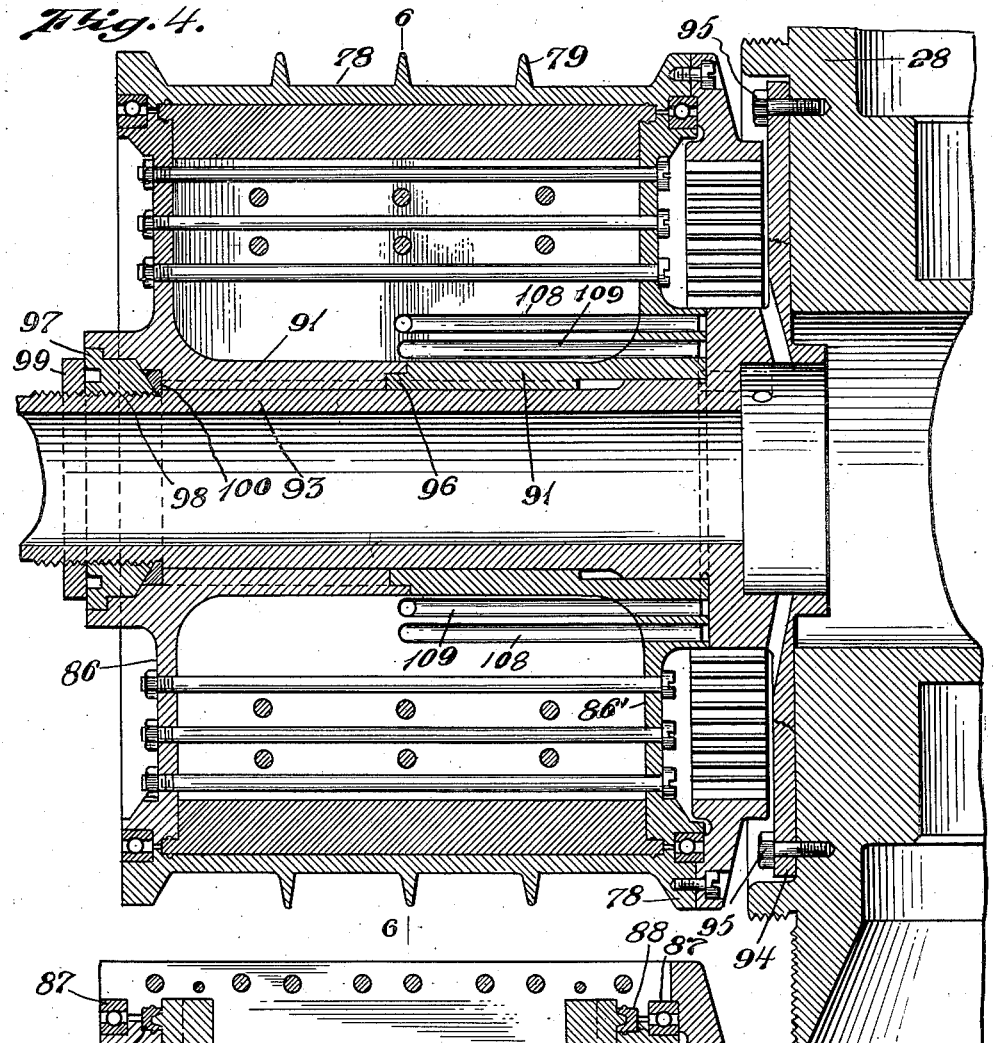
Fig. 4 is a section similar to Fig. 3 but showing the more outboard portion of the mechanism and also on the same scale as Fig. 3 and larger than the scale of Fig. 1.
Figure 5:
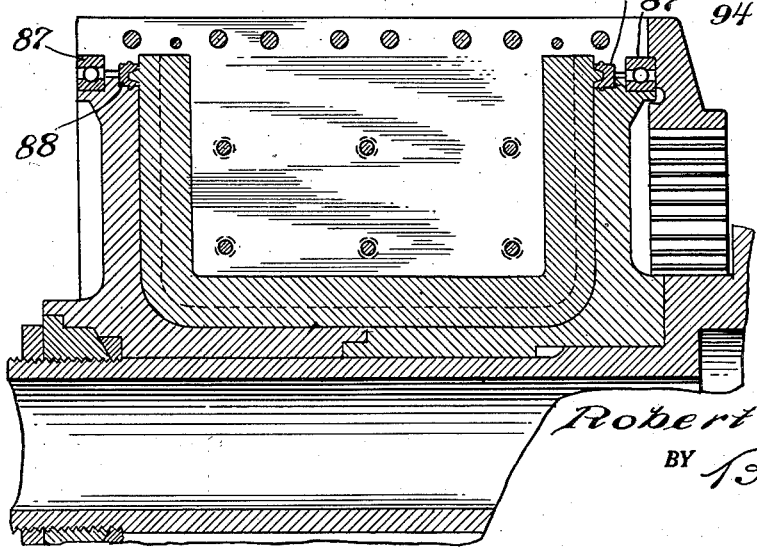
Fig. 5 is a sectional view similar to Fig. 4 but showing a different plane of section through the propeller shaft.
Figure 6:
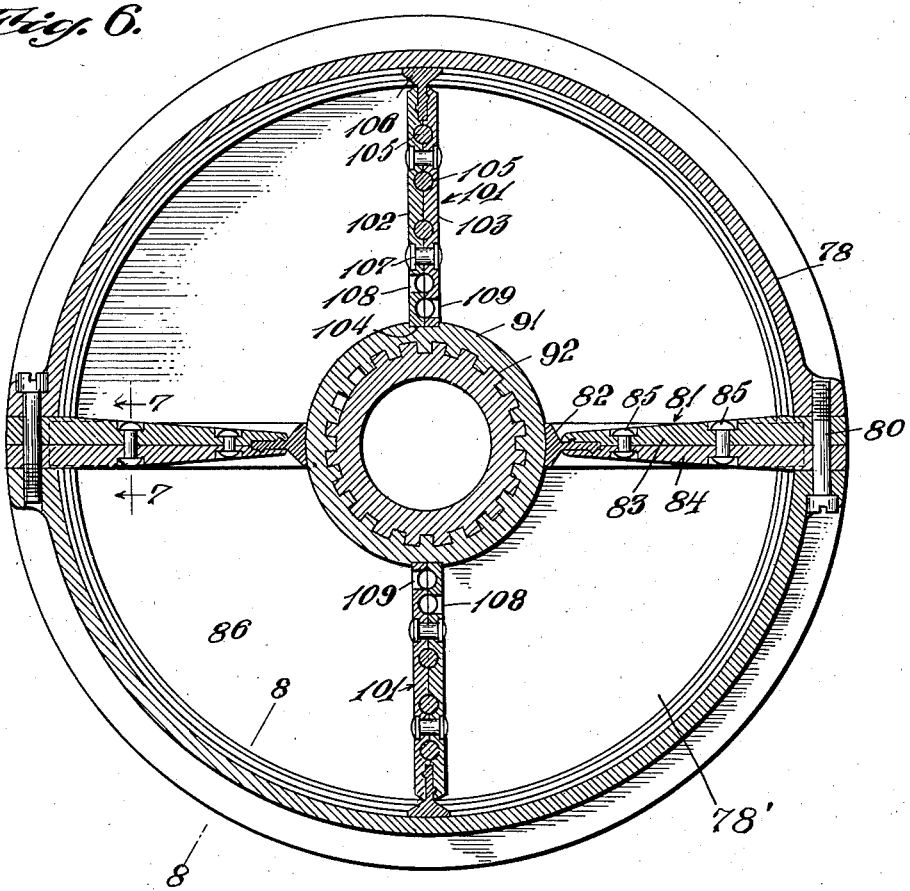
Fig. 6 is a section taken substantially on line 6—6 of Fig. 4.
Figure 7:
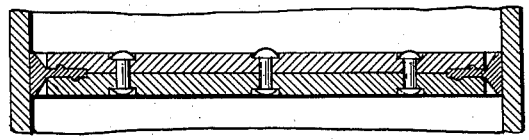
Fig. 7 is a section on line 7—7 of Fig. 6.
Figure 8:
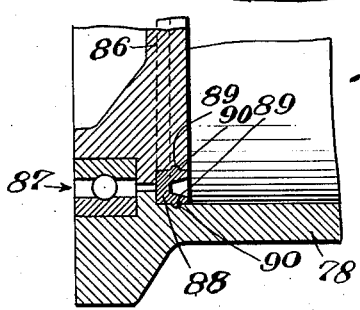
Fig. 8 is a section on line 8—8 of Fig. 6.

In order to rotate the worm 57 to change the pitch of the blades 50, each worm 57 is provided with a gear 75 (see Fig. 3) on an extending portion 58 which meshes with the internal teeth 76 (Fig. 1) of the ring gear 77 which is fixed to the casing 78 (see Fig. 4) of the actuating drum having fins 79 for strengthening the same. This drum is formed of halves bolted together as at 80 (Fig. 6) and holding between the sections so secured together vanes 81 having a packing portion 82 held between the sections 83 and 84 of the vanes by means of rivets 85. End plates 86 (Fig. 4) for the drum are rotatably mounted therein by means of ball bearing members 87 (Fig. 5), and packing rings 88 are relatively rotatably mounted between the casing 78 and the end plates 86 by means of tongues 89 (Fig. 8) located in grooves 90 in the drum 78 and in the end plates 86 and 86' providing a seat at these relatively rotatable connections. These end plates 86 (Fig. 4) and 86' are each provided with inwardly extending hubs 91 which are splined as at 92 onto the shaft extensions 93 provided with a flange 94 bolted as at 95 to the hub 28 of the propeller, these hubs interlocking with one another as at 96, the hubs being held together by means of the nut 97 having threaded engagement as at 98 with the shaft 93 and locked in position by the check nut 99. A packing 100 prevents leakage. Radial fins 101 (Fig. 6) consisting of sections 102 and 103 are located in a recess 104 in the hubs 91 and are connected to the end plates 86 by means of rods 105. Packing members 106 are held between the sections 102 and 103 by means of the rivets 107 and are cast integral with the packing rings 88. Suitable inlet ports 108 and 109 are provided in the vanes 101 for transmission of the fluid which is to supply the force for relatively rotating the vanes 101 and 81 with reference to each other. These inlet ports 108 and 109 extend into circular grooves 108a and 109a respectively, and which grooves receive fluid through communicating passages to be hereinafter described.

Figure 6A:
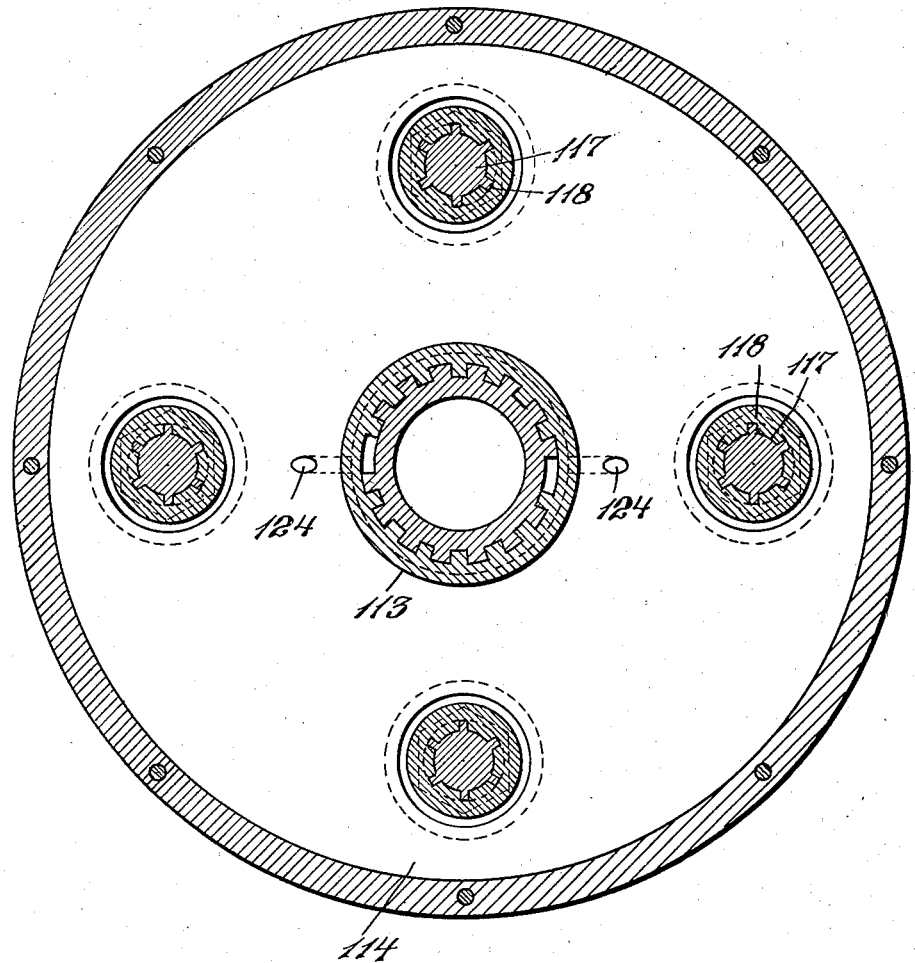

Alternatively, the gears 75 may be driven as illustrated in Figs. 4a, 5a and 6a, in which case these gears engage with the internal teeth 110 of the gear 111 which is also provided with a hub gear 112, which hub rotates upon the casing 113. This casing 113 is shaped to provide a cylinder 114 in which a piston 115 operates, which piston is provided with four threaded apertured bosses 115a, each adapted to threadedly receive a threaded shaft 117. The threads 118 on the shafts 117 are of such long pitch that the piston 115 may be moved to cause rotation of the shafts. Each of these shafts is equipped with a gear 119 which meshes with the teeth of the gear 112 so that upon operation of the shafts 117 the ring gear 111 will be rotated to in turn rotate each of the gears 75. The shafts 117 are each suitably supported at one end by thrust ball bearings 120 properly secured in bosses 121 provided in the closure cap 114a of the cylinder, while at the opposite end portion of each shaft 117 a suitable packing 122 and annular member 123 form a seal for the shaft which protrudes from the cylinder that the operating fluid will not escape. If it is desired to drive the shaft, liquid will enter through the conduit 124 to drive the piston inboard, while if it is desired that the piston be driven outboard, the liquid will be caused to enter through the conduit 124a. The conduits for the supply of fluid are formed in the forward portion of the shaft, as illustrated in Figs. 5a and 6a. Annular packing members 115b and 115c are properly secured to the piston 115 and form seals for preventing the escape of fluid from one side of the piston to the other.

*The pump*

There are three pumps utilized in this apparatus, each of which performs the function of developing the required amount of fluid pressure for operation of certain mechanism in response to controls for shifting the propeller blades angularly. These pumps are suitably located, usually close to the mechanism which they are to operate that the control lines may be of short extent. The drive for the mechanically driven pumps is taken from the internal toothed ring gear 125 (see Fig. 3) which is suitably fastened by means of a web 126 to the hub of the propeller shaft and serves to drive a gear 127 (see also Fig. 10) meshing with the internal teeth 128 of this ring gear. This gear 127 is secured to a worm screw which in turn drives the gear 129 on shaft 130 which has the pumping elements directly connected thereto. I will now shift from Fig. 10 to Fig. 11 for the continuation of the description.

Figure 9:
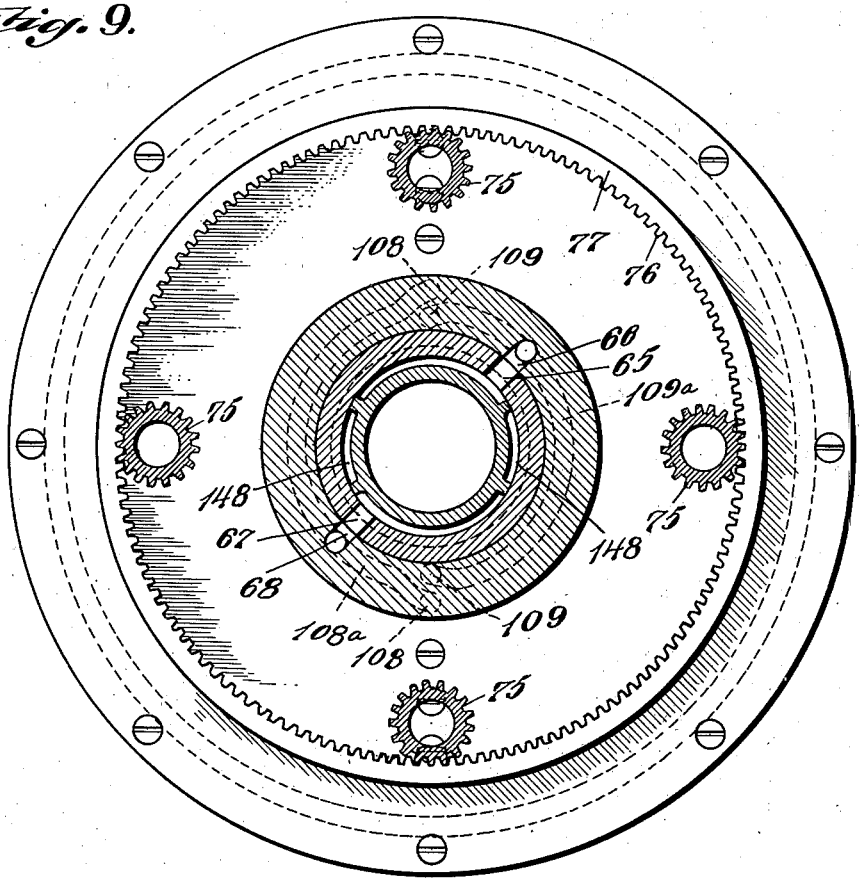
Fig. 9 is a section taken substantially on line 9—9 of Fig. 3.

The pump proper is secured to a fixed part of the apparatus which provides a boss 131 extending radially of the drive shaft. Assembled on this boss there are a plurality of sections 132, 133, 134, 135, 136 held to the boss by bolts 154 extending through all of the sections and section 136' held to section 136 by bolt 136". The boss 131 is recessed as at 137 so as to receive the portion 138 of the section 132 which is provided with a bearing bushing 139 for the reception of the shaft 130. This shaft is provided with a flange 139' having sealing engagement with the bushing 139 and is held in such engagement by spring 130' located in a recess in the shaft 130 and engaging ball 300". The section 133 and the section 135 are each provided with a central opening 140 in which one element 141 of the pump is rotatably mounted, while the other element 142 of the pump is keyed to the shaft 130 so that upon rotation the fluid in the space 143 will be pinched ahead of the rotor from one side to the other, that the fluid may be pumped, as is a known pump function. The other sections are provided with suitable channels for the conduction of the fluid from the reservoir to the mechanism which it is to operate. The reservoir is in the bullet-shaped end and consists of the space remaining in the casing 145 surrounding the blade-actuating mechanism. This reservoir is connected to the annular space 146 through conduit 147 (see Fig. 3), conduit 148, 149 connecting with said reservoir. Conduit 148 is formed by tube 150 having outward projections 152 to engage the inner surface of the shaft 25 and provide a plurality of channels of a necessary number for the conduction of fluid therealong. The channel 148a provides a passage for the fluid to openings 65 and 66 (see Fig. 9) which open into the circular groove 109a, and the channel 148b provides a passage for the fluid to openings 67 and 68 which lead into the circular groove 108a. The annular space 146 is connected to the aligned openings forming a conduit 153 extending along the length of the pump as shown in Fig. 11. The line of fluid flow by reason of the pump may be traced from the intake side of the pump from conduit 153 through opening 155, thence passage 156 into the interior 143 of the upper pump rotor. The discharge of this pump is through passages 157, 158, 159 and thence to recess 160 (see Fig. 12) and outwardly through recess 170 and pipe 171. If the pressure builds up too high in this pipe, the recess 160 will then discharge through the ball 161 backed up by spring 162 and controlled as to tension by threaded plug 163. The fluid from the chamber 164 passes through the conduit 165 back to the conduit 153 connected to the reservoir. The intake of the lower pump is through opening 166, 167 to the pump interior 143 and from the pump into the space 168 which is of arcuate shape and thence through conduit 169 to the outlet line 170a and 171a. This lower pump is provided with a relief valve similar to that of the upper pump and if the pressure increases to too great an extent, passage 170 may then discharge by ball 172 moving from its seat against the pressure spring 173 controlled by screw 174 so that the fluid will enter the recess 175 back of the ball then to conduit 176, conduit 177, back to the conduit 153 connecting to the reservoir.

In Fig. 10 there is also another pump which is driven from a separate electric motor. This pump is mounted on the boss 185 of a fixed portion of the supporting structure and has secured on this boss a series of sections 186, 187, 188, 189, and a motor mounting plate 190. These sections are suitably bound in position by bolts (not shown) such as described in connection with the pump shown in Fig. 11. Through all of these sections there extends drive shaft 191 which has mounted upon it the impeller 192 surrounded by the portion 193, each corresponding to the parts 142, 141 shown in Fig. 14. This pump connects with the reservoir by the conduit 194. A suitable electric motor is mounted and properly secured on the plate 190 and when energized, the shaft 191 will be driven to actuate the motor pump.

The control means

The fluid pressure supplied by the pump is directed to the drum for shifting the pitch of the propeller blades. Certain controls, however, are interposed in the line of this fluid supply and consist essentially of manual mechanism or valves which are manually operated for the accomplishment of different desired functions, automatic valves which will close when the angularity of the blade has arrived at a certain position so as to hold the same there, and an automatically-operated governor which causes a balance and controls the pump action in its supply of pressure to the actuating drum. These units will now be described.

Figure 16:
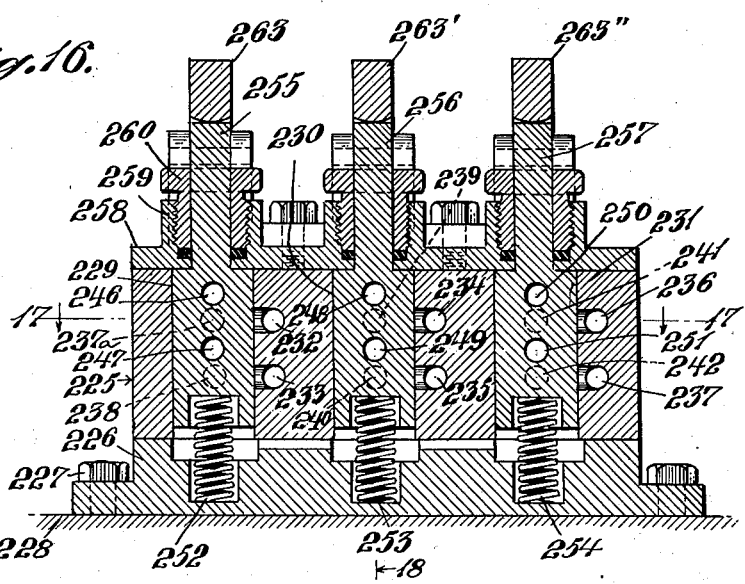
Fig. 16 is a detail sectional view illustrating certain of the manual control valves and taken on line 16—16 of Fig. 18.
Figure 17:
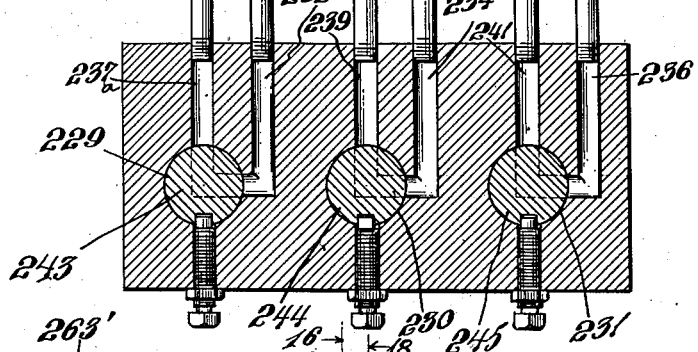
Fig. 17 is a section on line 17—17 of Fig. 16.
Figure 18:
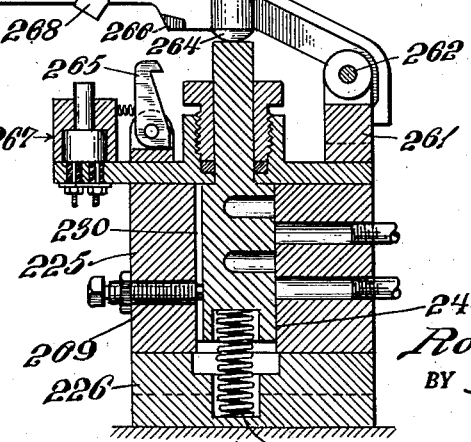
Fig. 18 is a sectional view taken at right angles to the showing of Fig. 16 and taken through the center control valve.

The manual control valve (see Figs. 16–18) consists of a body portion 225 suitably mounted upon a base 226 which in turn is secured to some suitable support 228 in the cockpit or control room handy for the operation by the pilot. The body 225 has a series of bores 229, 230 and 231 in accordance with the number of valves which are to be provided. In this case there are three, one for the usual driving range of the pitch of the propeller, one for feathering, and the other for unfeathering of the propeller blade. Each bore is provided with a pair of conduits as 232 and 233 for the bore 229; 234 and 235 for the bore 230; and 236 and 237 for the bore 23; each of which is generally L-shaped as illustrated in Fig. 17, while each bore is also provided with a pair of conduits, as at 237a, 238, 239, 240, 241, 242. In each bore there is a plunger as at 243, 244 and 245, and each plunger is provided with openings or channels as at 246, 247, 248, 249, 250, 251 for alignment with the aligned channels perpendicular to the axis of each of the bores when the plunger is in one position but out of such alignment when the plunger is in a different position. Each of these plungers is forced upwardly by springs 252, 253, 254 seated in suitable recesses in the base and in each plunger. Plungers are also reduced to provide a neck portion 255, 256, 257 which extends through a top plate 258 having openings suitably aligned with the axial bore in the body. A series of collars 259 extend about each of the openings in the top plate, and a packing gland nut 260 is threaded into such collar so as to provide a fluid-tight fit about the plunger. The top plate is also provided with a boss located opposite to each plunger, as at 261 (see Fig. 18), which provides a pivot at 262 for a handle or lever, there being one for each plunger, designated 263, 263′, 263″, each having a rounded projection 264 to engage the top of the neck 255 of each plunger so that when the lever is depressed, the plunger will be forced inwardly to cause its opening to connect with the openings in the body for the passage of fluid therethrough. A catch 265 may engage with a suitable portion 266 of the handle so as to lock the handle in depressed position and the valve in position for communication to occur. An electrical contact button designated 267, there being one for each of the levers 263′ and 263″, is engaged by the portion 268 of the handle so as to depress the same and to cause an electrical circuit to occur for some suitable actuation such, for instance, as the energization of the motor which drives the fluid pump. Each plunger is held in engagement with the portion of its wall in which the openings or conduits occur by reason of set screws 269.

The governor

Referring to Fig. 10, a boss 290 provided on a fixed portion of the mechanism is provided with a bore 291 in which there is rotatably mounted a shaft 292 provided with a gear 293 at its inner end driven by a gear 294 suitably secured on the end of a short shaft 294a on which a gear 294b is mounted and which meshes with the teeth of the gear 128 which is connected to and driven by the hub of the propeller. The shaft is rotatably mounted in ball bearings 295 held by a cap 296 within the casing 297, and suitably mounted by pivot 298 on this shaft 292 are a pair of governor arms 299 having weights 300 on the ends thereof. Portion 301 of these arms engages a plunger 302 in the bore 303 of this shaft 292 so as to force the same inwardly toward the shaft as the arms are thrown to their outermost position, as shown in Fig. 10. When the plunger is in its innermost position, as shown in Fig. 10, one set of openings permits communication, while, when in its different positions, a different set of openings operates. Pressures will be effective to move the plunger 302 outwardly when the arms drop. The plunger is provided with a hollow portion as at 304 and communicates with the conduit 305 which connects with the reservoir annulus 146. Suitable openings 306 and 307 are provided from this hollow center portion to register with openings 308 and 309 in the shaft which connects with annular grooves 310 and 311 from which suitable conduits lead through the boss 290.

Figure 3:
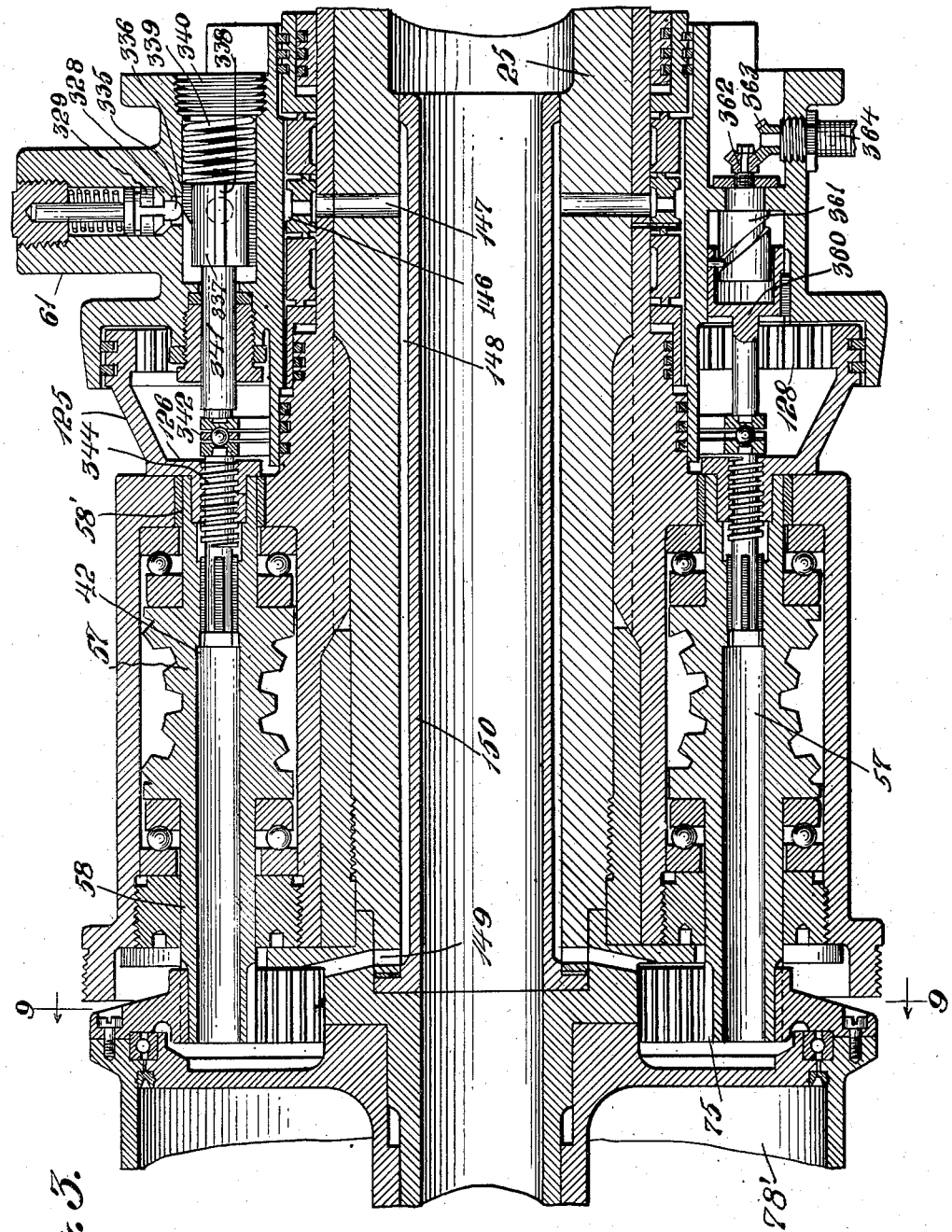
Fig. 3 is a section similar to Fig. 1 taken on a different plane than Fig. 1 and on a larger scale showing certain parts of the operating mechanism, the section being substantially on line 3—3 of Fig. 10.

The automatic valve designated generally 325 is housed in a boss also extending outwardly from the fixed portion of the machine as shown in Fig. 10, which boss forms the outer casing of the valve having a bore 326 in which there is the plunger type valve 327 having a valve seat 328 to engage the plunger portion 329 when seated. Fluid enters through the opening 330 above the valve and opposite a recess in the valve and will be discharged through the valve seat and outwardly at 331 when the valve is open, as shown in Fig. 10. The valve is slidably guided in the bore 332 of the plug 333 and forced in one direction by spring 334. This valve has a rounded end 335 which rides on a fin 336 of a plunger 337 which is suitably guided for axial movement by other fins 338 and is forced in one direction by a spring 339 (see Fig. 3) having a plug 340 to hold it in adjusted position. This plunger is provided with a stem 341 which is secured to the raceway of ball bearing member 342, the opposite raceway being connected to the threaded shaft 344 which is splined to axially slide with reference to the worm 57. Thus, as the propeller blade turns, the plunger 341 is forced to the right as shown in Fig. 3 against the action of the spring 339 so as to permit the valve to close and shut off the conduits through which fluid flows for control of or providing pressure for returning of the blade when it reaches its flying pitch of forty-five degrees.

A similar arrangement for moving another plunger 360 to actuate the helically-slotted drum 361 is provided so that an indicator operated through mitre gears 362 and 363 on shaft 364 may be actuated.

Operation

For a better understanding of the operation of this mechanism, reference is made to Fig. 23, which shows diagrammatically the several control mechanisms, pumps and valves for controlling the flow of fluid through these several devices. The fluid from the pumps flows through proper conduits to the manually controlled valves and from there through proper conduits enters the channels 148, 148a and 149a through openings 69, 70 and 71 (Fig. 19) provided in the section 72 of the propeller hub. The governor is interposed in the passages extending from the manually controlled valves and in which the fluid from the upper and lower pump flows.

Let it be assumed that the motive force has been set into motion and the several parts properly adjusted which will cause the propeller hubs and parts secured thereto to revolve with the shaft 25 as a unit and with the propeller blades set at an idling position. Shaft 341 (Fig. 3) will be in a forward position (to left Fig. 3) and valve 61 (Fig. 23 or 327 Fig. 3) will be open. The operator then actuates manually the lever 263 of the control mechanism, generally designated 225 in Fig. 16, and forces the valve plunger 243 downwardly against the pressure of the spring 252 until the latch 265 engages the portion 266 provided on the lever and locks this lever in position, which aligns the conduit 246 with the conduit 232 and 237a, and the conduit 247 with the conduits 233 and 238. The fluid will then flow (Fig. 23) from the upper pump, here designated 60, through the conduit 400, through the aligned conduits 233, 247 and 238, through the conduit 401, through conduit 402, through the valve 61, which at the present instant is open to the flow of fluid, through conduit 403' which branches into conduits 404 and 405 which open into the cylinder provided in the casing 78.

The fluid from the lower pump, designated 63, flows through 406, aligned openings 232, 246 and 237a, through conduit 407, and through conduit 409 and into the cylinder through branch conduits 410 and 411.

Under normal operating conditions pumps 60 and 63 apply pressure to opposite sides of the fluid motor to lock the fluid motor. The governor valve 62 vents or by-passes the fluid from either pump so that the normal pressure of the other pump will operate the fluid motor to vary the pitch, it being apparent that the pressure on one side of the vanes decreases through the operation of the governor so that the pressure on the other side will vary the angularity of the propeller blades. The pressure built up on one side of the vanes 81 will cause a relative movement of the casing 78 and the vanes 101 which are secured to rotate as a unit with shaft 25 and will rotate the gear 76 which is fixed therewith to cause a rotation of the worm screw 57 and rotate the propeller blades to an advanced position.

If the pitch is varied beyond the normal operating range the valve 61 will close and render the governor control of the pitch motor inoperative. This valve 61 is controlled by the plunger 337 which is operated by the rotation of the worm screw 57. This plunger will move to allow the valve member 329 to be seated against the valve seat 328 to stop the passage of fluid through the valve.

If it is desired to "feather" the propeller blades, the fluid power is controlled for this purpose. The lever 263 is moved to release the plunger which is moved upwardly by the spring 252, and the lever 263' is then moved to force the plunger 244 downwardly to align the openings 234, 248, 239 and the openings 235, 249 and 240 with each other. In moving the lever 263' the electrical switch 267 will be actuated to close the electric motor circuit 412 which will cause the motor pump generally designated 64, to be placed in operation, and the fluid will flow therefrom through conduit 413, thence through aligned openings 234, 248, 239, thence through conduit 414 which connects to conduit 403', and thence through conduits 404 and 405 to the cylinder 78' to actuate the vanes to move the propeller blades to feather position.

If it is desired to return the blades to unfeathered position, other levers are allowed to return to normal, and the lever 263'' is moved in a direction to force the plunger 245 to align the openings 236, 250 and 241 and openings 237, 251 and 242 which will permit the flow of fluid from the pump 64 to conduits 413, thence through conduit 416 through conduit 236, then through aligned openings 236, 250 and 241, thence through conduit 417 which communicates with conduit 410 and 411, and from there into cylinder 78'' to move the vanes affected thereby in a direction to unfeather the propeller blades. The fluid on the opposite side of these vanes is returned to the reservoir 146 through conduits 404 and 405, thence through aligned openings 242, 251, 237 and conduit 418 which leads into the reservoir, the switch 267 affected by the moving of the lever 263'' having previously set the motor pump into action.

The return flow of fluid when the plunger 244 is in a position to align the several openings therein may be traced through the conduits 410 and 411 and conduit 418, thence through aligned openings 240, 249, 235 and conduit 419 which also leads to the reservoir 146.

I claim:

1. A variable pitch propeller mechanism comprising a shaft, a propeller hub mounted on said shaft and rotatble therewith, a plurality of propeller blades each rotatably anchored to said hub for angular movement about their respective axes, a plurality of threaded shafts, a gear train operatively connecting said threaded shafts to said propeller blades for rotating the same about their respective axes upon rotation of said threaded shafts about their respective axes, said gear train including a ring gear embracing said shaft, and pinion gears carried by said threaded shafts and in engagement with said ring gear, pinions engaging said ring gear and connected to said blades, a cylinder, a piston slidably movable therein having a plurality of threaded openings extending therethrough, said threaded shafts extending through said openings and in threaded engagement therewith and rotatable about their respective axes in response to movement of said piston.

2. A variable pitch propeller mechanism comprising a shaft, a propeller hub mounted on said shaft and rotatable therewith, a plurality of propeller blades each rotatably anchored to said hub for angular movement about their respective axes, a plurality of threaded shafts, a gear train operatively connecting said threaded shafts to said propeller blades for rotating the same about their respective axes upon rotation of said threaded shafts about their respective axes, said gear train including a ring gear embracing said shaft and pinion gears carried by said threaded shafts and in engagement with said ring gear, pinions engaging said ring gear and connected to said blades, a cylinder embracing said shaft, a piston movable in said cylinder having a plurality of threaded openings therethrough, said threaded shafts extending through said threaded openings and in threaded engagement therewith and rotatable about their respective axes in response to movement of said piston.

3. A variable pitch propeller mechanism comprising in combination with a hollow shaft opened at each end thereof and free of any obstruction therein and a propeller hub mounted on said shaft and rotatable therewith, a plurality of propeller blades each rotatably anchored to said hub for angular movement about their respective axes, a cylinder in the form of an annulus embracing said hollow shaft intermediate the ends thereof a piston having a plurality of threaded openings therein movable in said cylinder, and threaded shafts extending through said openings and in threaded engagement therewith and rotatable about their respective axes in response to movement of said piston and a gear train for connecting said threaded shaft to said propeller for rotating the same about their respective axes upon rotation of said threaded shafts, said gear train including a ring gear embracing said hollow shaft at a location adjacent said cylinder and pinion gears carried by said threaded shafts and in engagement with said ring gear, and additional pinions engaging said ring gear and each connected through a shaft to one of said blades.

4. A variable pitch propeller mechanism in combination with a propeller hub having a plurality of propeller blades each rotatably anchored to said hub for angular movement about their respective axes, of means for biasing each of said blades about its own axis comprising a cylinder having a piston therein with fluid on opposite sides thereof and actuated by the difference in pressure of the fluid on said piston, two conduits through which fluid flows to said cylinder, a plurality of pumps each supplying fluid under pressure to said cylinder, one to one side of said piston and another to the other side of said piston, a single manually operable valve for controlling the flow of fluid from said pumps, two by-pass conduits one from one of said conduits and the other in by-pass relation to the other of said conduits, a governor actuated valve through which each of said by-pass conduits extend, an additional pump, a plurality of manually operable valves, conduits extending from said pumps to said valves, conduits from each of said valves to either side of said piston, and means actuated by the opening of either of said valves for actuating said additional pump to force fluid under pressure through said conduits to a selected side of said piston.

5. A variable pitch propeller mechanism in combination with a propeller hub having a plurality of propeller blades each rotatably anchored to said hub for angular movement about their respective axes, of means for biasing each of said blades about its own axis comprising a cylinder having a piston therein with fluid on opposite sides thereof and actuated by the difference in pressure of the fluid on said piston, two conduits through which fluid flows to said cylinder, separate sources supplying each of said two conduits with fluid under pressure, one to one side of said piston and the other to the other side of said piston, means to manually control the flow of fluid from said sources, an additional separate source of supply of fluid under pressure, a plurality of manually operable valves, conduits extending from said additional source of supply to said valves, conduits from each of said valves to either side of the piston one in reverse relation to the other whereby the selected valve will serve to move the piston in the desired direction.

ROBERT STEVENSON.